(12) United States Patent
Wang et al.

(10) Patent No.: US 8,780,242 B2
(45) Date of Patent: Jul. 15, 2014

(54) MULTI-BAND SENSORS

(75) Inventors: Weng Lyang Wang, Saratoga, CA (US); Shengmin Lin, Santa Clara, CA (US)

(73) Assignee: CMOS Sensor Inc., Cupertino, CA (US)

( * ) Notice: Subject to any disclaimer, the term of this patent is extended or adjusted under 35 U.S.C. 154(b) by 62 days.

(21) Appl. No.: 13/555,101

(22) Filed: Jul. 21, 2012

(65) Prior Publication Data
US 2014/0022425 A1    Jan. 23, 2014

(51) Int. Cl.
*H04N 3/14* (2006.01)
*H04N 5/335* (2011.01)

(52) U.S. Cl.
USPC ................... 348/294; 348/144; 348/374

(58) Field of Classification Search
None
See application file for complete search history.

(56) References Cited

U.S. PATENT DOCUMENTS

| | | | | |
|---|---|---|---|---|
| 5,757,423 A | * | 5/1998 | Tanaka et al. | 348/218.1 |
| 6,750,488 B1 | * | 6/2004 | Driescher et al. | 257/292 |
| 7,796,153 B1 | * | 9/2010 | Sanderson et al. | 348/145 |
| 7,796,174 B1 | * | 9/2010 | Harwit et al. | 348/311 |
| 2003/0193589 A1 | * | 10/2003 | Lareau et al. | 348/294 |
| 2010/0013537 A1 | * | 1/2010 | Eminoglu et al. | 327/306 |
| 2010/0046853 A1 | * | 2/2010 | Goodnough et al. | 382/275 |
| 2010/0213355 A1 | * | 8/2010 | Wang et al. | 250/216 |
| 2011/0019046 A1 | * | 1/2011 | Wang et al. | 348/301 |
| 2011/0149132 A1 | * | 6/2011 | Wang et al. | 348/300 |
| 2012/0293669 A1 | * | 11/2012 | Mann et al. | 348/207.11 |

* cited by examiner

*Primary Examiner* — Dennis Hogue
(74) *Attorney, Agent, or Firm* — Joe Zheng

(57) ABSTRACT

Designs of multi-band sensor array to generate multi-spectral images are disclosed. According to one aspect of the present invention, a multi-band sensor array includes one linear sensor configured to sense a scene in panchromatic spectrum to produce a panchromatic (PAN) sensing signal, and four color-band linear sensors to sense the same scene in different color bands to produce respective sensing signals. These sensors are packaged in a single module that is disposed on a single optical plane when used to scan a scene. A multi-spectral image is produced by combining these sensing signals. Further a unique packaging of the sensor array and a combination of soft and hard PCB are disclosed to withstand extremes in a harsh environment.

16 Claims, 14 Drawing Sheets

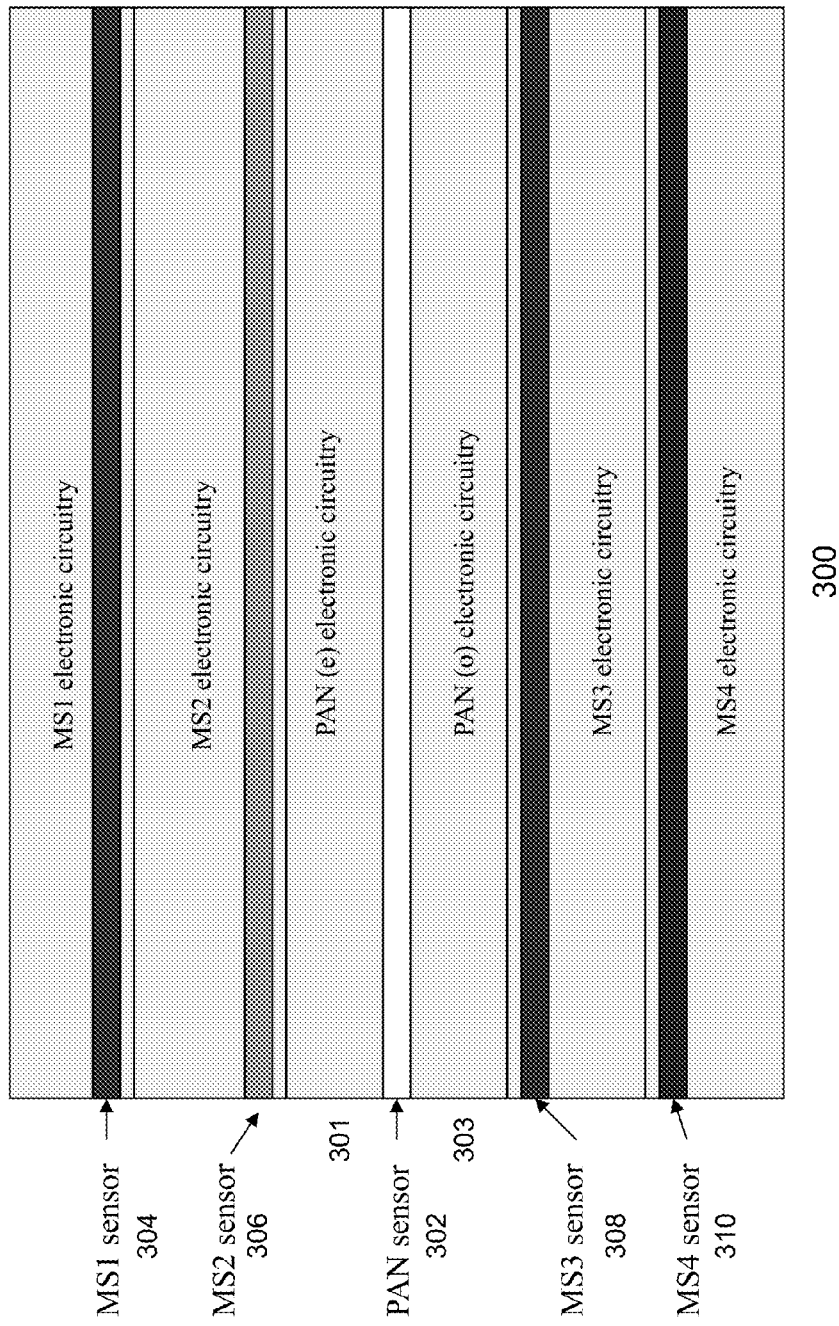

MULTI-BAND SENSORS

BACKGROUND OF THE INVENTION

1. Field of the Invention

The present invention is generally related to the area of image sensors and scanning technologies, and more particularly is related to image sensors with multiple bands suitable for use in various scanning applications including remote sensing.

2. Description of the Related Art

Remote sensing is related to the acquisition of information about an object or phenomenon without making physical contact with the object. In modern usage, the term generally refers to the use of aerial sensor technologies to detect and classify objects on Earth (both on the surface, and in the atmosphere and oceans).

There are two main types of remote sensing: passive remote sensing and active remote sensing. Passive remote sensing detects natural radiation that is emitted or reflected by the object or surrounding areas. Reflected sunlight is the most common source of radiation measured by passive sensors. Examples of passive remote sensors used in the passive remote sensing include film photography, infrared, and charge-coupled devices (CCD), and radiometers. Active remote sensing, on the other hand, emits energy in order to scan objects and areas whereupon a sensor then detects and measures the radiation that is reflected or backscattered from the target. RADAR is an example of active remote sensing, where the time delay between emission and return is measured, establishing the location, height, speed and direction of an object being radiated by the emitted energy (electromagnetic waves).

One of the passive remote sensing techniques is to use what is commonly referred to as remote sensing instrument (RSI) that includes multiple linear image sensors to capture a ground scene. A satellite map or image is then formed from respective signals from the multiple linear image sensors. For example, an exemplary RSI may use one panchromatic (PAN) signal and four Multi-Spectral (MS) signals from the multiple linear image sensors. In general, besides the PAN signal, there are four MS signals Blue (B), Green (G), Red (R), and Near Infrared (NIR), which are used to create a colorful satellite image.

In a high resolution and high performance RSI, the instrument needs 5 individual linear sensor arrays. The pixel size and number of pixel element are determined by the optical system for the individual linear sensor arrays, the satellite orbit and the swath width. For imagery at 720 km above the earth, the optical reduction is about 200,000. The pixel size of 10 um represents 2 meters resolution on the ground. For a linear sensor of 12,000 pixels, the image swath width is 24 km. The resolution of the PAN signal is normally higher than that of the MS signals. Thus the pixel size for the pixels generating the MS signals is typically larger and the pixel number is smaller than that of the pixel size for the pixels generating the PAN signal.

In the remote sensing applications, the current RSI uses folding mirrors to guide the different ray traces (incoming lights) to different optical planes, where one or more individual sensor arrays are positioned. FIG. 1 shows a mirror block to fold different ray traces (via respective filters) and project a corresponding colored ray onto one designated sensor array. Each of the MS CCD-based arrays is located on an independent optical plane. FIG. 2 shows another way to use folding mirrors to design a RSI. The folding mirror guiding the PAN ray trace to a PAN focal plane while the MS folding mirrors direct the MS ray traces to the MS focal planes. The focal planes of PAN and MS are different optical planes. The folding optical methods require very complicated optical system design.

As the sensor arrays used in the current RSI are commonly CCD-based devices while other circuits (e.g., AGC and amplifiers) are CMOS-based. It is well known that the integration of the CCD sensors and the CMOS-based circuitry requires very sophisticate skill sets given the working conditions in which a RSI operates. The RSI needs to operate in space, thus the RSI system designs are required to consider the thermal, structure and mechanical extremes in the space. These considerations and resulting design parameters often cause the RSI designs very complicated, hard to make and bulky.

There is thus a great need for different architectures of RSI that may have small footprint, broad operating wavelength range, enhanced impact performance, lower cost, and easier manufacturing process.

Likewise, such architectures may make it possible to be used in other applications such as detecting counterfeit currency or authenticating certain certificates or cards.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to designs of multi-band sensor arrays to generate multi-spectral images. According to one aspect of the present invention, a multi-band sensor array includes one linear sensor configured to sense a scene in panchromatic spectrum to produce a panchromatic (PAN) sensing signal; and four color-band linear sensors to sense the same scene in different color bands to produce respective sensing signals. These sensors are packaged in a single module that is disposed on a single optical plane when used to scan a scene. A multi-spectral image is produced by combining these sensing signals.

According to another aspect of the present invention, each of the linear sensors in the single module is formed by concatenating a number of short linear sensors practically fabricated from a wafer to accommodate the need of scanning an elongated area. According to yet another aspect of the present invention, the multi-band sensor array is fabricated as a whole from a wafer, where each of the elongated sensors is formed using what is called wafer butting technology to form a gapless image sensor array.

To place such a multi-band sensor array for using in remote sensing, a multi-layer ceramic packaging technique is applied to pack the module so that a camera system employing the module is able to withstand the thermal, structure and mechanical extremes in the space. The ceramic package is also built in with a resistor network for LVDS matching and a capacitance network to the sensor power supply to reduce the noise. To further withstand the thermal, structure and mechanical extremes in the space, the ceramic packaged multi-band sensor array is coupled to an electronic circuit board by way of a combination of hard and soft printed circuit board (PCB). The hard and soft PCBs are made at the same time, where the soft flexible PCB board is sandwiched by the hard PCBs. The hard PCB is used to assemble all of the electronic circuitry or accommodate parts of the supporting circuit(s). The soft flexible PCB is used for coupling the outputs of the ceramic packaged multi-band sensor array to the hard PCBs.

The present invention may be implemented in many forms such as a sensor module, a method or a part of a system. According to one embodiment, the present invention is an image sensor array comprising at least one first linear sensor configured to sense a predefined spectrum to produce a first sensing signal; and a plurality of second linear sensors, each of the second linear sensors configured to sense a predefined band of spectrum, wherein the second linear sensors produce respectively a plurality of second sensing signals, wherein the at least one first linear sensor and the second linear sensors are packaged in a single module and produce the first sensing signal and the second sensing signals when the module is caused to have a movement relative to a scene being scanned.

There are many objects, features, and advantages in the present invention. Different objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 3 shows an array of multi-band sensors according to one embodiment of the present invention;

DETAILED DESCRIPTION OF THE INVENTION

Figure 1:
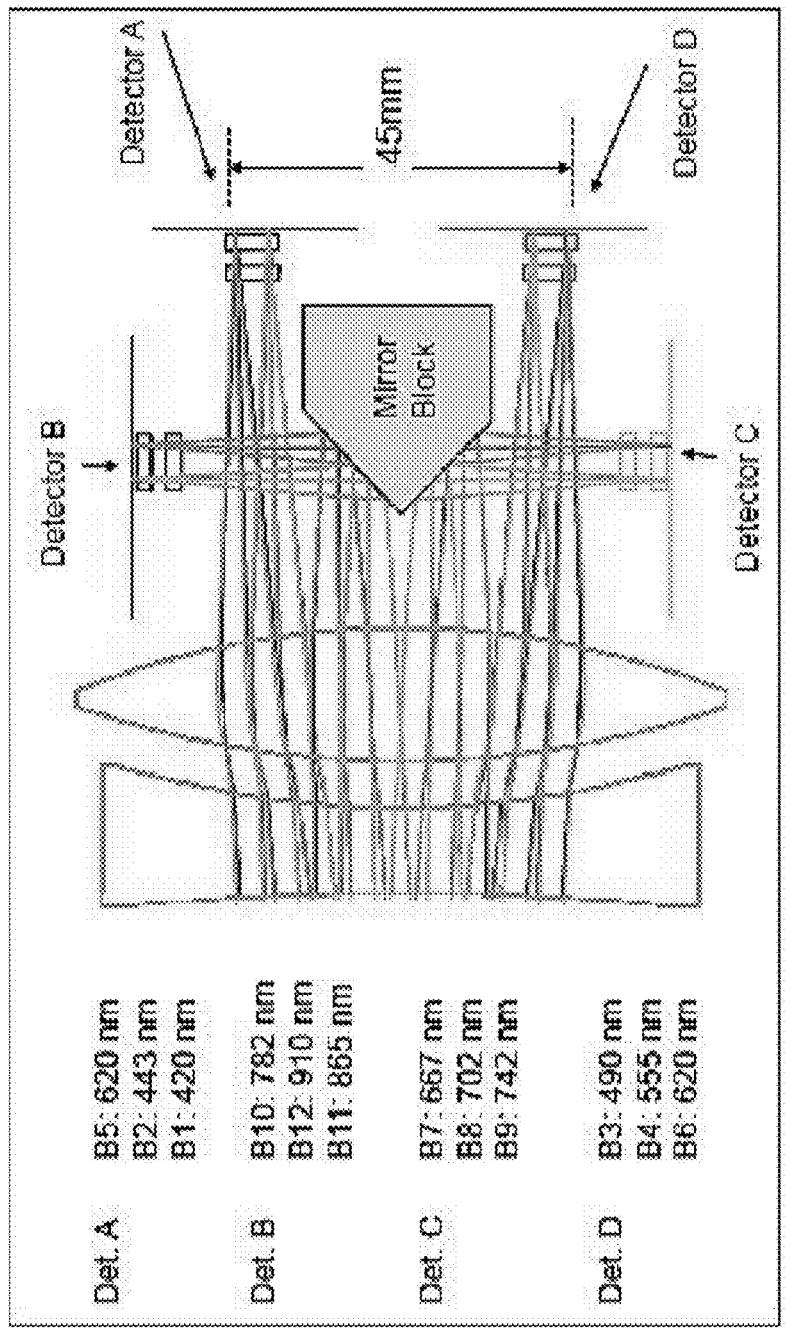
FIG. 1 shows a mirror block to fold different ray traces (via respective filters) and project a corresponding colored ray onto one designated sensor array.
Figure 2:
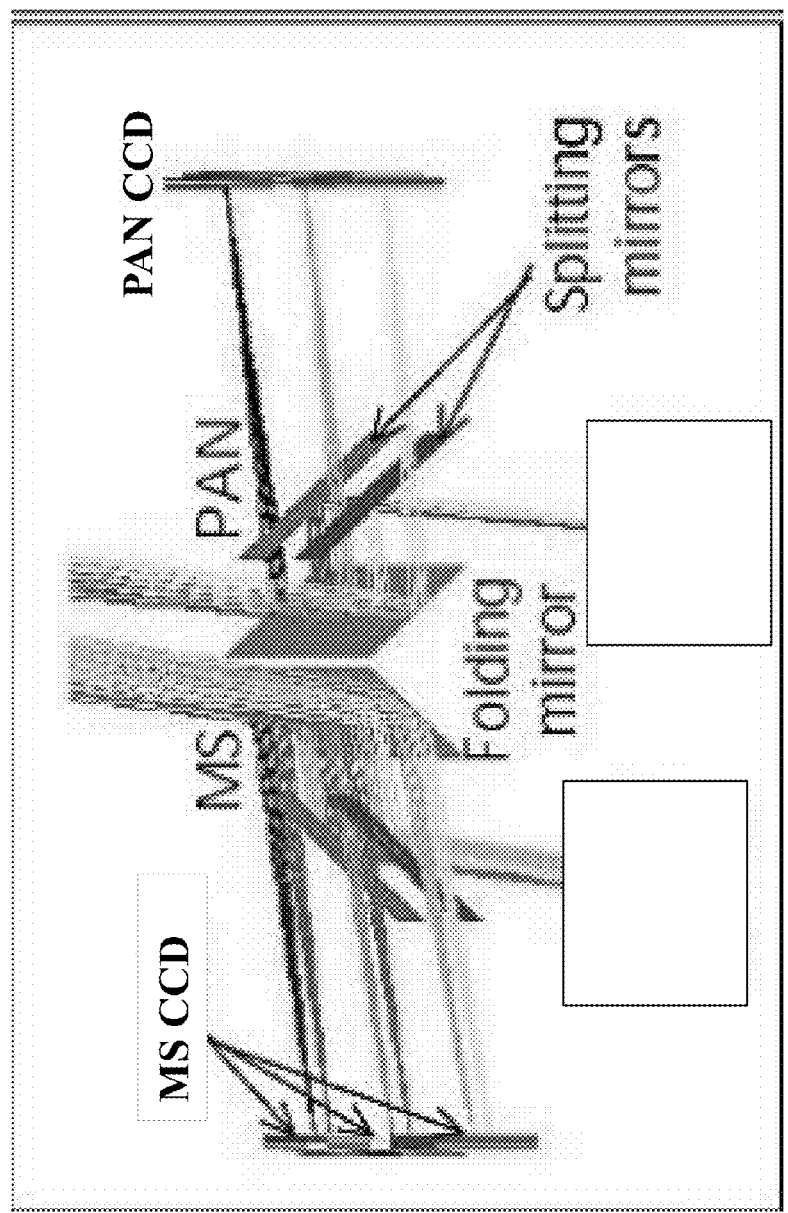
FIG. 2 shows another way to use folding mirrors to design a RSI.

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention. The detailed description is presented largely in terms of procedures, logic blocks, processing, and other symbolic representations that directly or indirectly resemble the operations of data processing devices coupled to networks. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Referring now to the drawings, in which like numerals refer to like parts throughout the drawings. FIG. 3 shows an array of multi-band sensors 300 according to one embodiment of the present invention. As shown in FIG. 3, the array of multi-band sensors 300 includes five image sensors disposed in parallel, separated by a corresponding support circuit for one sensor. These five sensors are respectfully referred to as a PAN sensor 302 and four color-band sensors 304, 306, 308 and 310. Depending on implementation, the sensors 302, 304, 306, 308 and 310 may be separately coated with a filter designed to pass through a specified frequency band or disposed behind a special filter. While the PAN sensor 302 is designated to sense a broad spectrum, often resulting in a visually grey image of a scene, each of the color-band sensors 304, 306, 308 and 310 produces an image within one frequency band from sensing the same scene. In one embodiment, three of the color-band sensors 304, 306, 308 and 310 produce images in red, green and blue and the fourth one produces an image in infrared. When five images from the sensors 302, 304, 306, 308 and 310 are properly combined, a multi-spectral image is produced. When the array of sensors 300 is used in remote sensing, a satellite image can be obtained.

One of the objects, benefits and advantages of the array of multi-band sensors 300 is that all the sensors are disposed on one image plane, resulting in a much simpler optical system design, hence small footprint, broad operating wavelength range, enhanced impact performance, high performance, no registration error, lower cost, and easier manufacturing process. Further the sensors are CMOS-based and packaged in one unit, making it easier to operate with other CMOS-based circuits.

According to one embodiment, the pixel resolutions of the sensors 302, 304, 306, 308 and 310 are designed to be different to accommodate different applications. In one application, the pixel resolution of the PAN sensor 302 is different from that of the color-band sensors 304, 306, 308 and 310, where the resolution is twice or more than that of the color-band sensors 304, 306, 308 and 310.

To accommodate the fast readout of the image signals from the PAN sensor 302, there is a pair of supporting circuits 301 and 303, each designated to support even pixels or odd pixels. Essentially, two circuits 301 and 303 are provided to alternatively read out sensing signals from the PAN sensor 302.

As described above, the sensing coverage in remote sensing is relatively wide, resulting in an array of elongated multi-band sensors 300, for example, over 10 cm long. From a practical perspective, there is no such a CMOS wafer that could be used to produce such a long sensor. Even if a wafer size could be increased to such a size, it would be very costly to produce such elongated multi-band sensors. According to one embodiment, multiple small sensors are concatenated to form one of the gapless sensors 302, 304, 306, 308 and 310.

Figure 4A:
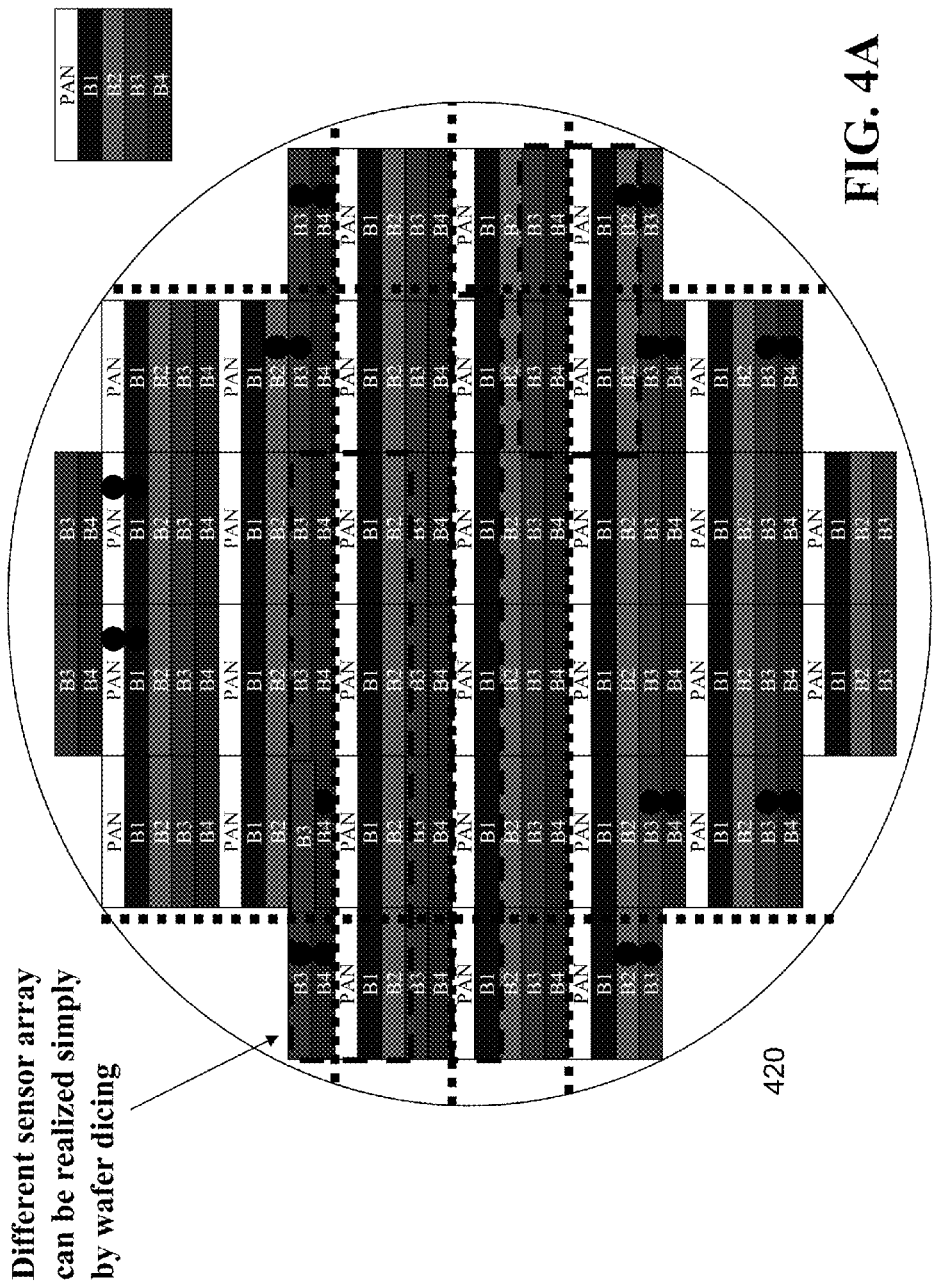
FIG. 4A shows an example of how to fabricate a gapless large size sensors chip by using a stepper photolithographic technology on modern semiconductor wafer.
Figure 4B:
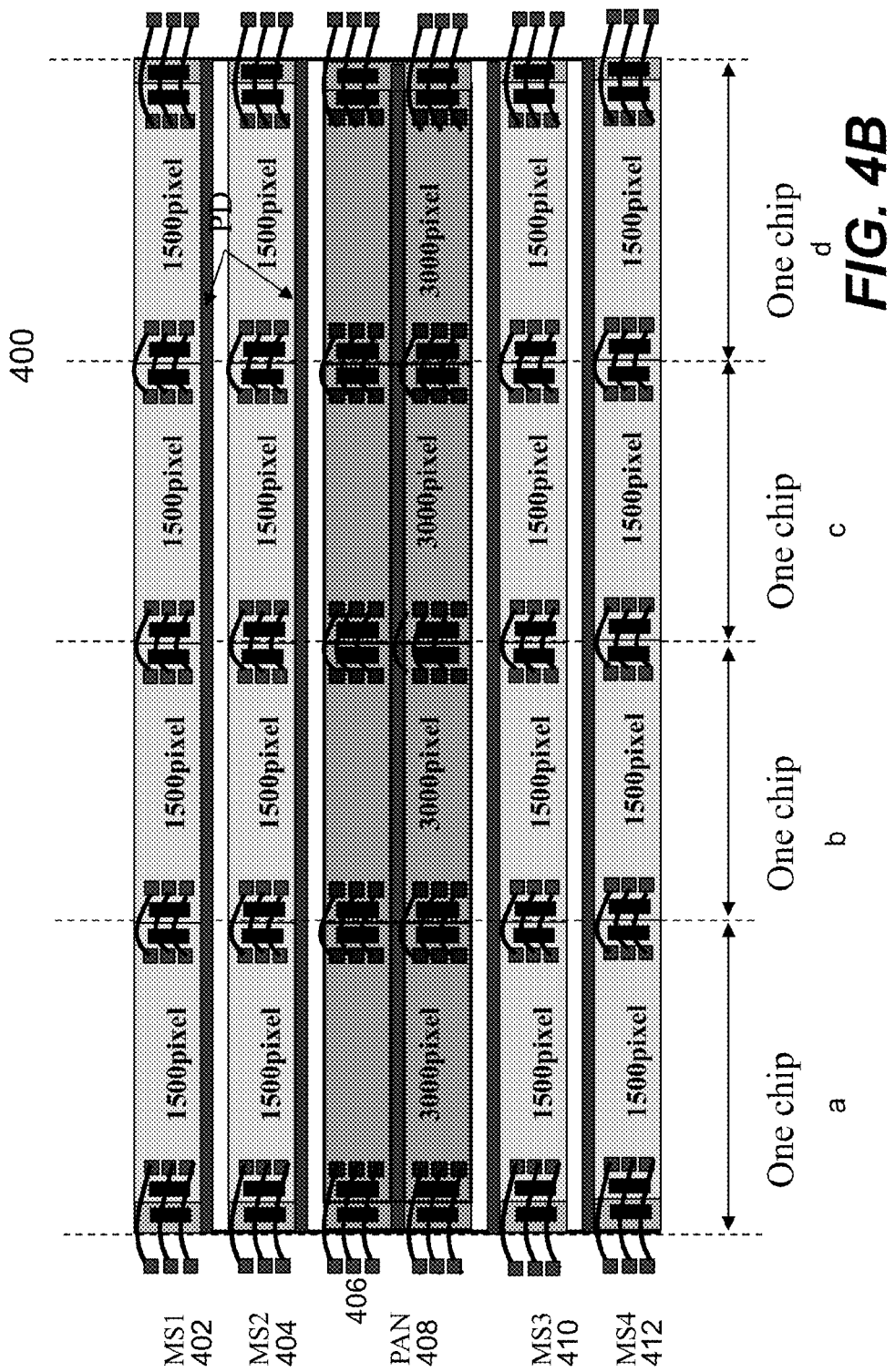
FIG. 4B shows a configuration of a multi-band sensor array according to one embodiment of the present invention.

FIG. 4A shows an example of how to fabricate smaller sensors from a wafer 420. FIG. 4B shows a configuration of a multi-band sensor array 400 according to one embodiment of the present invention. The multi-band sensor array 400 shows there are five color-band sensors 402, 404, 408, 410 and 412, each is formed by concatenating four individual linear sensors (chips) a, b, c and d by using what is referred herein as wafer butting technology. The individual linear sensors a, b, c and d are fabricated as shown in FIG. 4A. If needed, another sensor may be included to cover a particular spectrum or two sensors 406 and 408 are provided for the PAN sensing in one embodiment.

Figure 5:
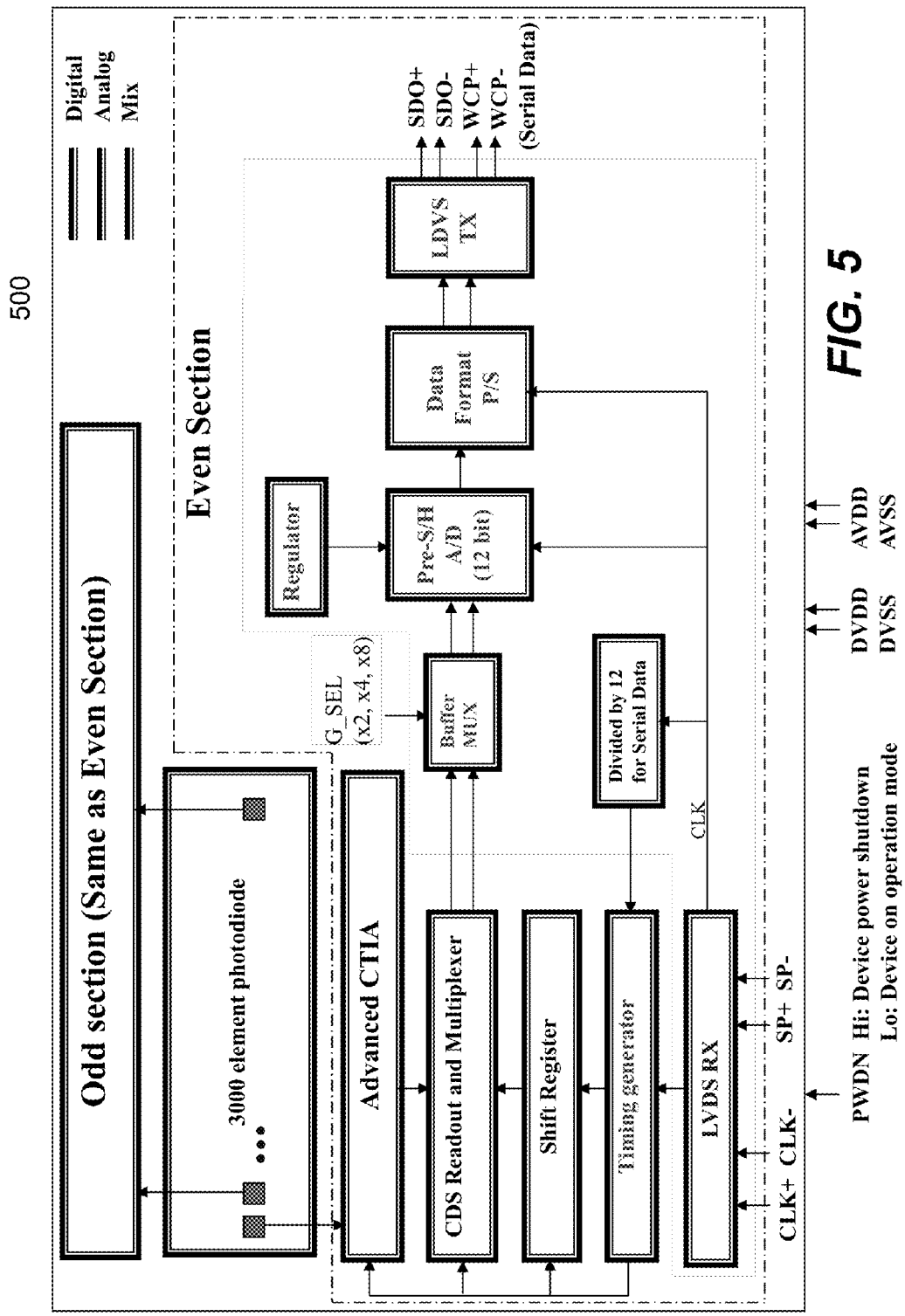
FIG. 5 shows one exemplary implementation of a corresponding support circuit to operate the PAN sensor and read out the sensing signals therefrom.
Figure 6:
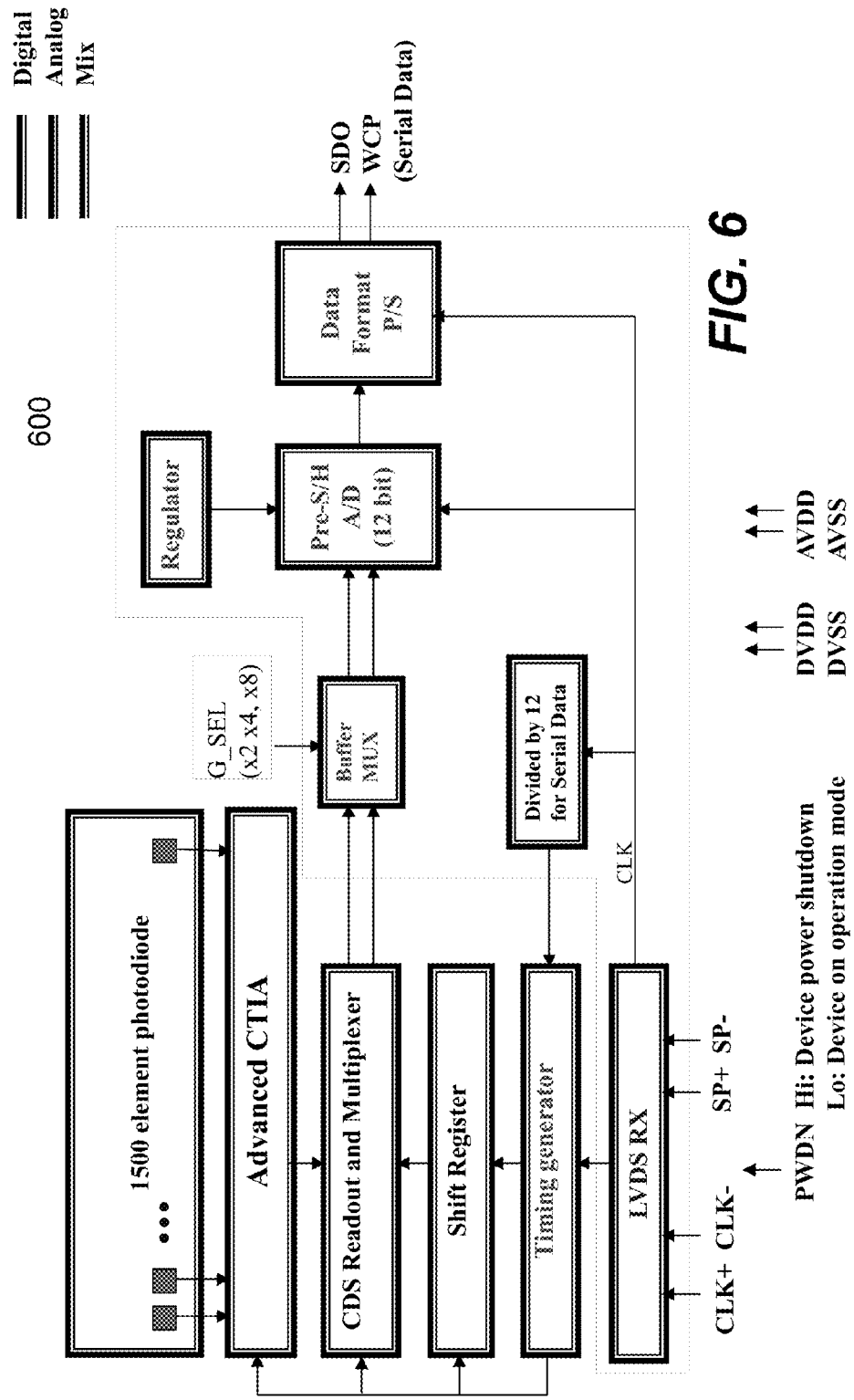
FIG. 6 shows one exemplary implementation of the corresponding support circuit to operate one of the other color-band sensors and read out the sensing signals therefrom.

Operationally, the PAN sensor 408 has eight outputs simultaneously, four are for odd reading and the other four for even reading, and each of the other color-band sensors 402, 404, 410 and 412 has four outputs simultaneously. FIG. 5 shows one exemplary implementation of the corresponding support circuit 500 to operate the PAN sensor 408 and read out the sensing signals therefrom. FIG. 6 shows one exemplary implementation of the corresponding support circuit 600 to operate one of the other color-band sensors 402, 404, 410 and 412 and read out the sensing signals therefrom.

Figure 7A:
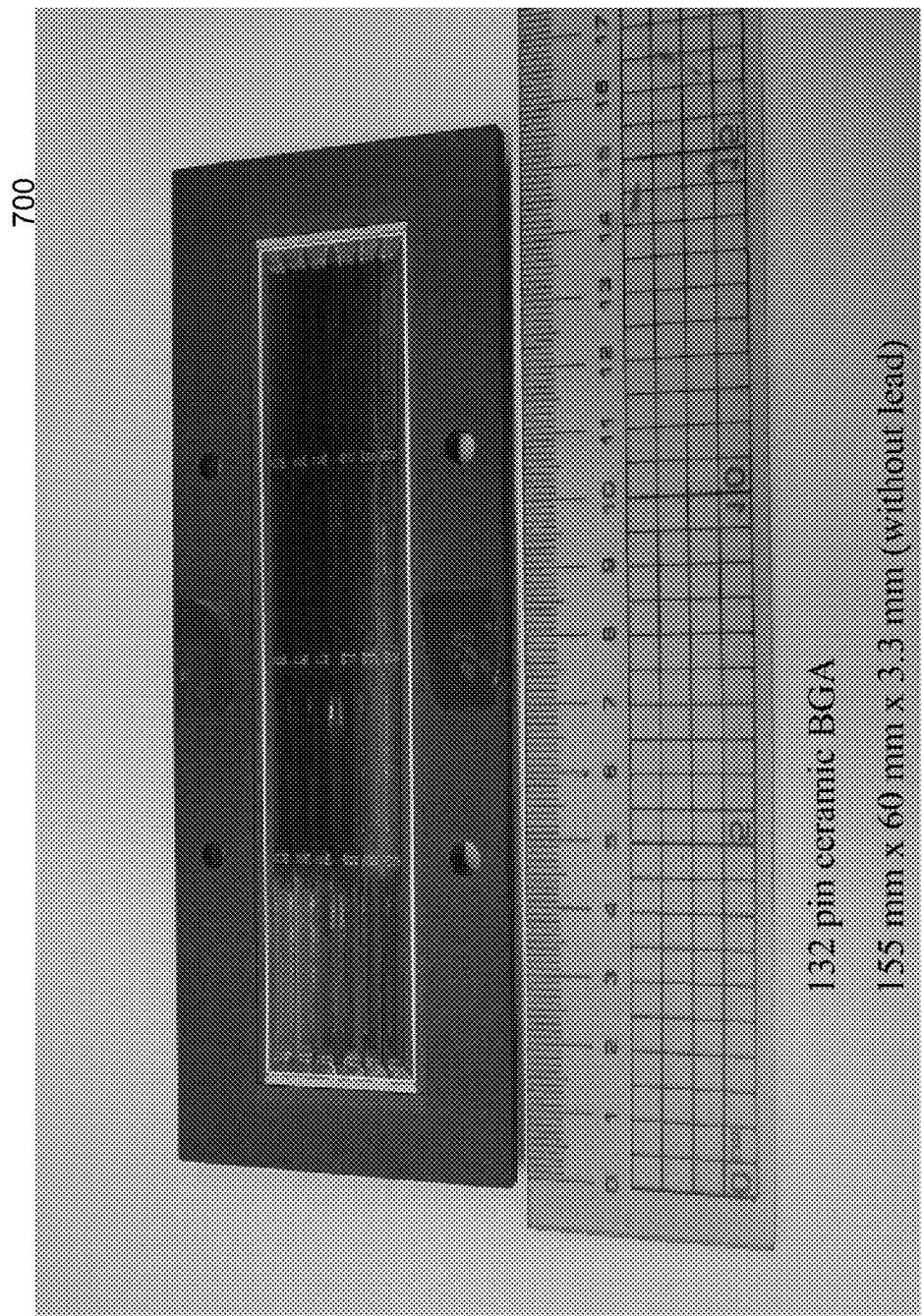
FIG. 7A shows a picture of such a multi-band sensors (e.g., corresponding to the multi-band sensors of FIG. 3) in ceramic package that may be used for remote sensing.
Figure 7B:
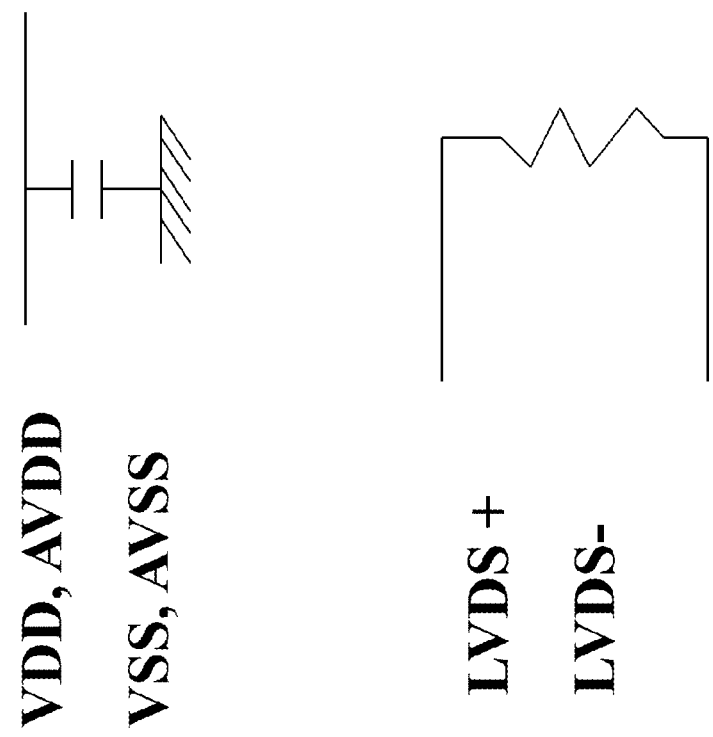
FIG. 7B shows an exemplary implementation of utilizing the ceramic package to form a RC circuit needed for the CMOS-based sensor to read out the sensing signals.
Figure 7C:
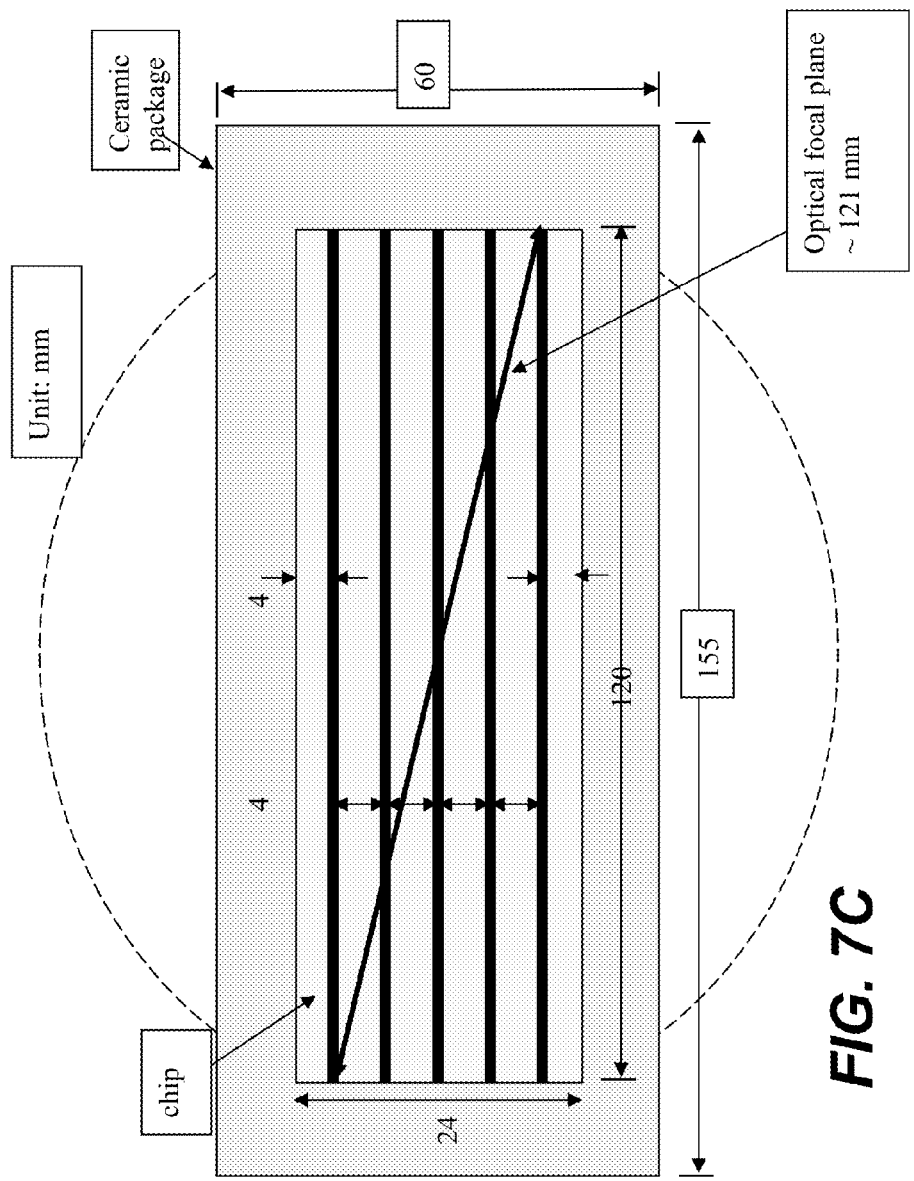
FIG. 7C further shows how such a ceramic package may be disposed on a plane behind a focal lens (not shown in the figure)

FIG. 7A shows a picture of such a multi-band sensors (e.g., corresponding to the multi-band sensors 300 of FIG. 3) in ceramic package 700 that may be used for remote sensing. It shows the actual size of the entire ceramic package 700 with or without pins in one embodiment of the multi-band sensors array. Different packaging may be possible depending on application of the sensors. FIG. 7B shows an exemplary implementation of such ceramic packaging that utilizes 1) the plane layer of ceramic package to form larger decoupling capacitance to greatly reduce power/ground noise; 2) the routing layer in ceramic package to build LVDS terminal resistance. FIG. 7C further shows how such a ceramic package may be disposed on a plane behind a focal lens (not shown in the figure) in one embodiment.

Figure 8:
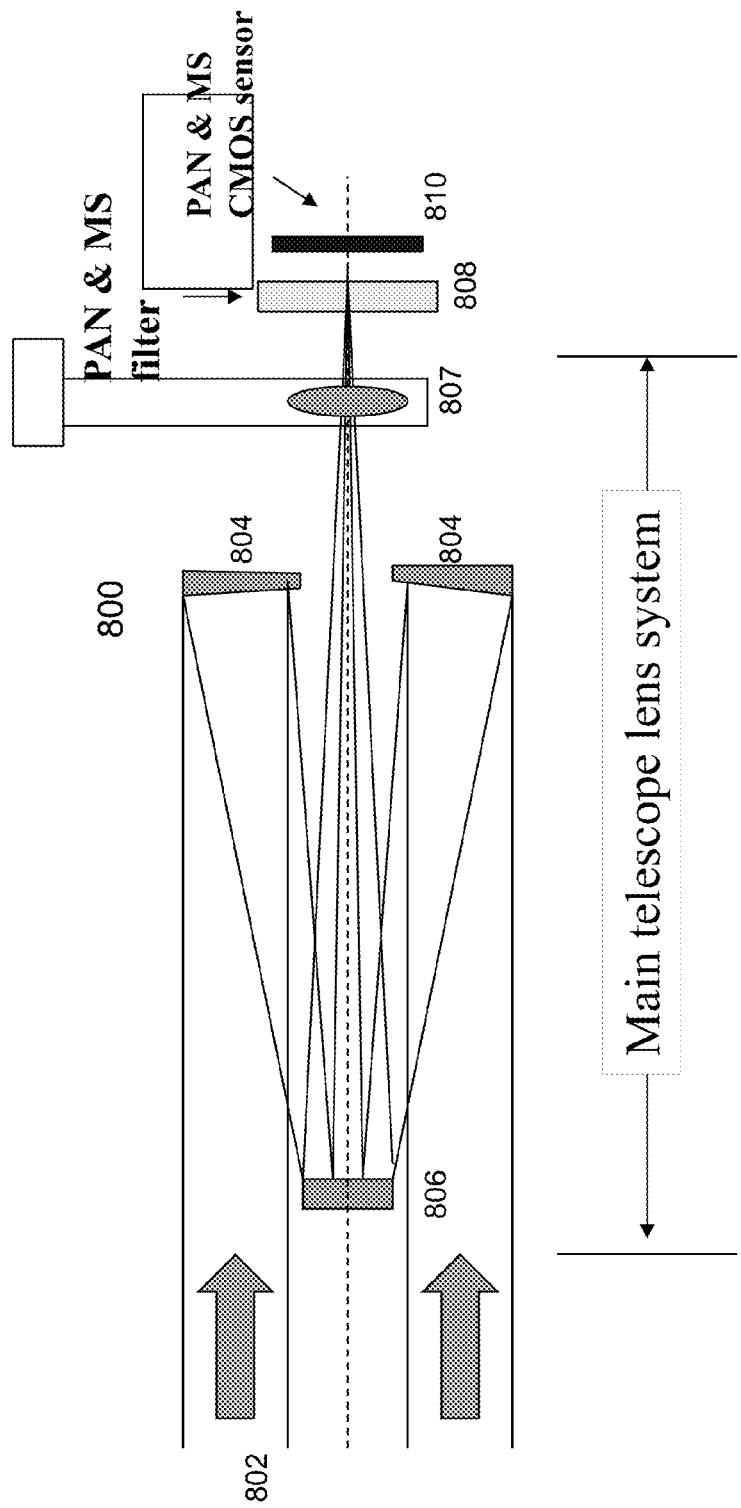
FIG. 8 shows an exemplary design of a telescope lens system that may be used together with the multi-band sensors shown in FIG. 3 for remote sensing.

FIG. 8 shows an exemplary design of a telescope lens system that may be used together with the multi-band sensors 300 of FIG. 3 for remote sensing. Reflected lights 802 are coming from a scene and captured by one or more lenses 804 to focus the reflected lights 802 to a mirror 806 that directs the focused lights to a lens 807 that further focuses the lights onto the multi-band sensors 810.

Figure 9A:
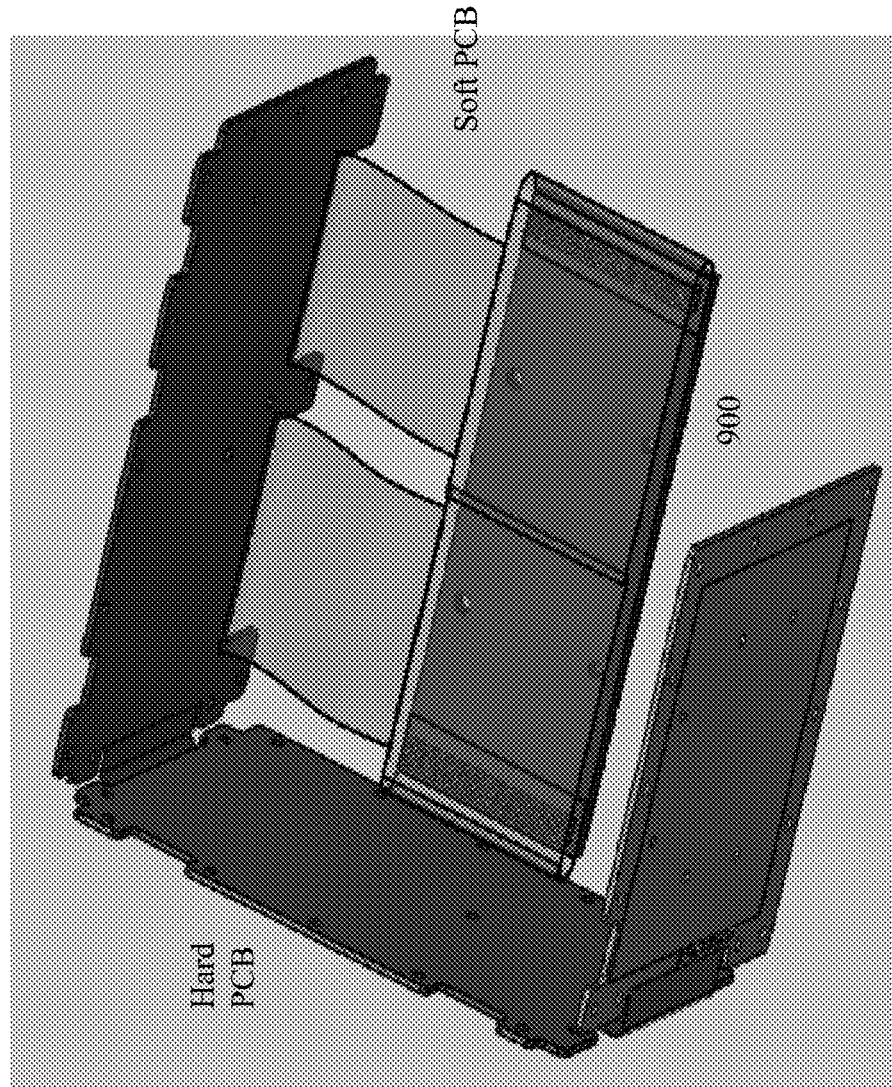
FIG. 9A shows how such an elongated multi-sensors array in ceramic package may be integrated in a camera system for remote sensing application.

FIG. 9A shows how such an elongated multi-sensors array in ceramic package may be integrated in a camera system for remote sensing application. According to one embodiment, a pair of buses is used to couple the sensor array 900 to other circuit modules (e.g., control circuits and power) that are disposed next to the sensor array 900. The buses are turned 90 degrees to bridge the connections between the sensor array 900 and the modules.

Figure 9B:
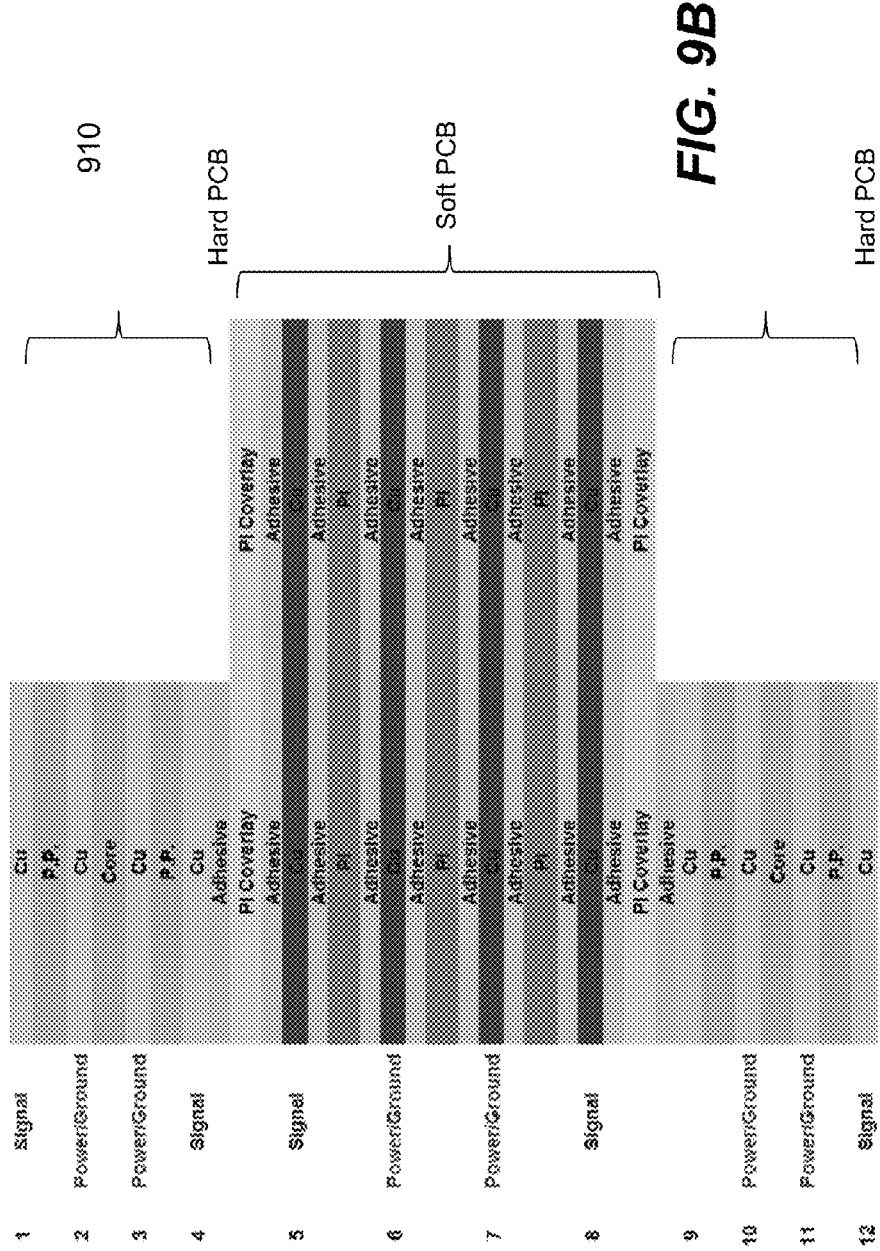
FIG. 9B shows an exemplary embodiment of connections that may be used to couple a sensor to other circuit modules.

FIG. 9B shows an exemplary embodiment of connections 910 that may be used to couple a sensor (e.g., the sensor array 810 of FIG. 8) to other circuit modules. To withstand the thermal, structure and mechanical changes or other extremes in a harsh environment (e.g., the space), the ceramic packaged multi-band sensor array is coupled to an electronic circuit board via unique connections by way of a combination of hard and soft printed circuit board (PCB). As shown in FIG. 9B, the connections or a bus is a multi-layer structure with the soft flexible PCB board sandwiched by two hard PCBs. In one embodiment, the hard and soft PCBs are made at the same time. The hard PCB is used to assemble all of the electronic circuitry while the soft flexible PCB is used for coupling the outputs of the ceramic packaged multi-band sensor array to the hard PCBs. The unique structure of the connections enable the sensor and the circuits to sustain various thermal, structure and mechanical changes or other extremes in a harsh environment.

Figure 9C:
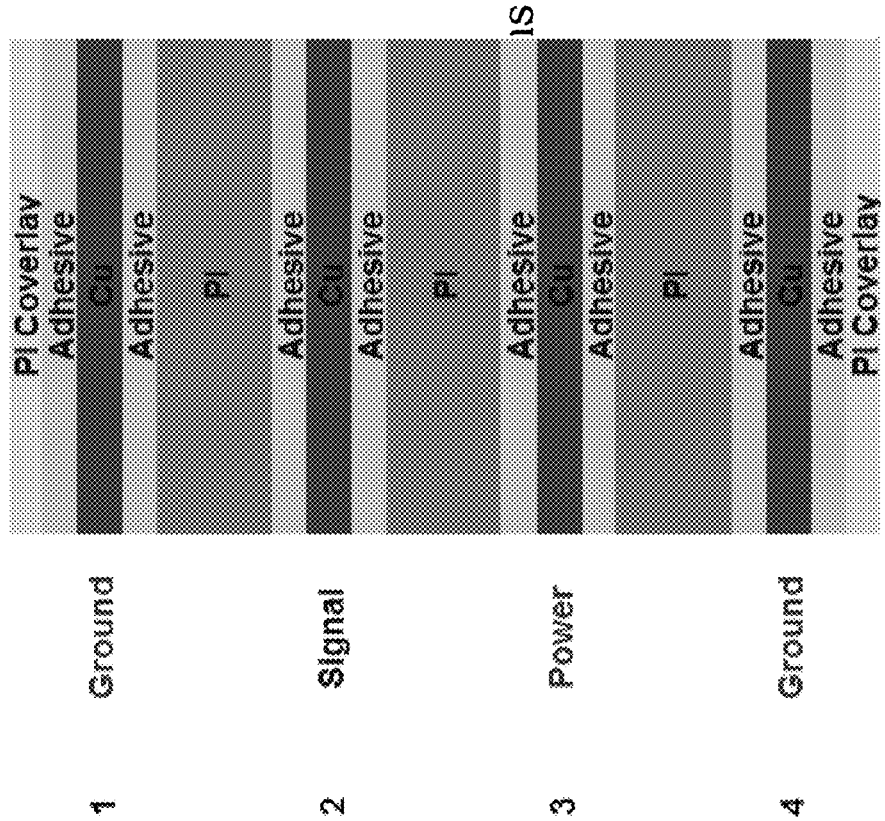
FIG. 9C shows an exemplary structure of the soft PCB that may be used to couple a sensor to the circuit modules on a hard PCB.

FIG. 9C shows an exemplary structure of the soft PCB that may be used to couple a sensor (e.g., the sensor array 810 of FIG. 8) to the circuit modules on the hard PCB.

Although the above description is largely based upon the application of remote sensing, those skilled in the art may understand from the description herein that other packaging technique may be used depending on where and how such a sensor array is used. The ceramic package shall not be interpreted as a limitation to the present invention.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

We claim:

1. A camera system comprising:
an image sensor array including
at least one first linear sensor configured to sense a predefined spectrum to produce a first sensing signal,
a plurality of second linear sensors, each of the second linear sensors configured to sense a predefined band of spectrum, wherein the second linear sensors produce respectively a plurality of second sensing signals, and
a pair of supporting circuits designated to read out sensor signals alternatively from even pixels and odd pixels of the at least one first linear sensor to produce the first sensing signal from the at least one first linear sensor;
a readout circuit; and
a multi-layer structure formed by two hard rigid printed circuit boards and a soft flexible printed circuit board, wherein the at least one first linear sensor and the second linear sensors, arranged collectively in a column on a same plane, are packaged in a single module and produce respectively the first sensing signal and the second sensing signals when the module is caused to have a movement relative to a scene being scanned, and the single module is packaged in a ceramic structure and has at least one array of pins, the ceramic structure is built in with a resistor network for LVDS (low voltage differential signaling) matching and a capacitance network for a sensor power supply to reduce noise, the image sensor array is coupled to the readout circuit by the multi-layer structure, the soft flexible printed circuit board is sandwiched by the two hard rigid printed circuit boards, and each of the hard rigid printed circuit boards is used to accommodate parts of the readout circuit while the soft flexible printed circuit board is used for coupling outputs of the image sensor array to the hard rigid printed circuit boards.

2. The camera system as recited in claim 1, wherein the at least one first linear sensor has a resolution higher than that of the second linear sensors.

3. The camera system as recited in claim 2, wherein the first sensing signal results in a grey-level image from the predefined spectrum while the second sensing signals result in colored images from a number of predefined bands in the spectrum.

4. The camera system as recited in claim 3, wherein the at least one first linear sensor is for generating a panchromatic (PAN) signal while the second linear sensors are for generating respectively red, green, blue and nearly-invisible signals.

5. The camera system as recited in claim 4, wherein a multi-spectral image is produced by combining the panchromatic (PAN) signal with the red, green, blue and nearly-invisible signals.

6. The camera system as recited in claim 2, wherein the at least one first linear sensor is disposed in between the second linear sensors.

7. The camera system as recited in claim 6, wherein the first sensing signal from the at least one first linear sensor results in a grey-level image from the predefined spectrum while the second sensing signals from the second linear sensors result in colored images from a number of predefined bands in the spectrum.

8. The camera system as recited in claim 1, wherein each of the at least one first linear sensor and the second linear sensors is coated with a filter.

9. The camera system as recited in claim 1, wherein each of the at least one first linear sensor and the second linear sensors is positioned behind a filter.

10. The camera system as recited in claim 1, wherein the at least one first linear sensor and the second linear sensors are fabricated from a single semiconductor wafer.

11. The camera system as recited in claim 10, wherein each of the at least one first linear sensor and the second linear sensors is formed using wafer butting technology to form a gapless image sensor array.

12. The camera system as recited in claim 1, wherein each of the at least one first linear sensor and the second linear sensors is formed by concatenating a plurality of individual linear sensors.

13. The camera system as recited in claim 12, wherein each of the linear sensors has its own outputs, the outputs from the linear sensors in said each of the at least one first linear sensor and the second linear sensors are coupled together to form one of the first sensing signal and the second sensing signals.

14. The camera system as recited in claim 1, wherein the pair of supporting circuits are disposed on opposite sides of the at least one first linear sensor.

15. The camera system as recited in claim 14, wherein a first one of the pair of supporting circuits for the at least one first linear sensor is designed to read out the first sensing signal from even pixels, and a second one of the pair of supporting circuits for the at least one first linear sensor is designed to read out the first sensing signal from odd pixels.

16. The camera system as recited in claim 1, wherein the camera system is for remote sensing application.

* * * * *